United States Patent [19]

Tsuge et al.

[11] 4,288,098
[45] Sep. 8, 1981

[54] PISTON RETURN STOP DEVICE FOR TENSIONING DEVICE OF SEAT BELT

[75] Inventors: Noboru Tsuge, Kariya; Satosi Kuwakado, Aichi; Toshihiro Takei; Toshiaki Shimogawa, both of Okazaki; Seiichi Chiba, Susono, all of Japan

[73] Assignees: Nippon Soken, Inc., Nishio; Toyota Jidosha Kogyo Kabushiki Kaisha, Toyota, both of Japan

[21] Appl. No.: 45,921

[22] Filed: Jun. 6, 1979

[30] Foreign Application Priority Data

Jun. 7, 1978 [JP] Japan .......................... 53-77426[U]

[51] Int. Cl.³ .............................................. B60R 21/10
[52] U.S. Cl. ................................ 280/806; 188/371; 297/480
[58] Field of Search ................ 280/806, 805; 297/480; 188/1 C; 60/632, 635, 638; 180/268

[56] References Cited

U.S. PATENT DOCUMENTS

| | | | |
|---|---|---|---|
| 3,891,271 | 6/1975 | Fieni | 297/480 |
| 3,917,031 | 11/1975 | Doin et al. | 280/806 |
| 3,937,487 | 2/1976 | Pech | 297/480 |
| 3,957,281 | 5/1976 | Pech | 297/480 |
| 4,023,427 | 5/1977 | Beier | 280/806 |

*Primary Examiner*—David M. Mitchell
*Assistant Examiner*—Donn McGiehan
*Attorney, Agent, or Firm*—Cushman, Darby & Cushman

[57] ABSTRACT

A seat belt tensioning device having a piston return stop device including a tapered member with an inclined surface rising toward one end which is slidably disposed within an axial hole of a piston and is connected to the piston through a connecting member breakable by a predetermined tension force. The other end of the tapered member is connected with a seat belt. Stopper members are slidably disposed within radial guide grooves of the piston and at their outer ends are slidably in contact with an inner wall of a piston cylinder while their inner ends are in contact with the tapered member.

When the tension force of the seat belt reaches a predetermined value at an urgent time, the connecting member is broken and the tapered member is moved within the piston in a direction reverse to the travelling direction of the piston to push the stopper members toward the cylinder wall. Then the outer ends of the stopper members cut into the cylinder wall so that the return of the piston is stopped with certainty.

20 Claims, 6 Drawing Figures

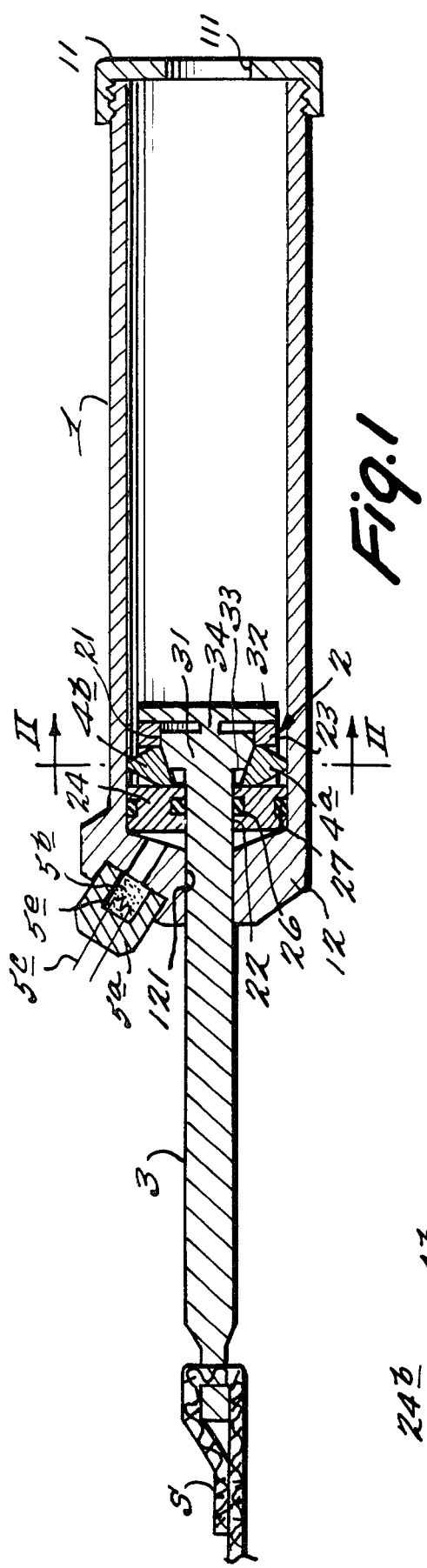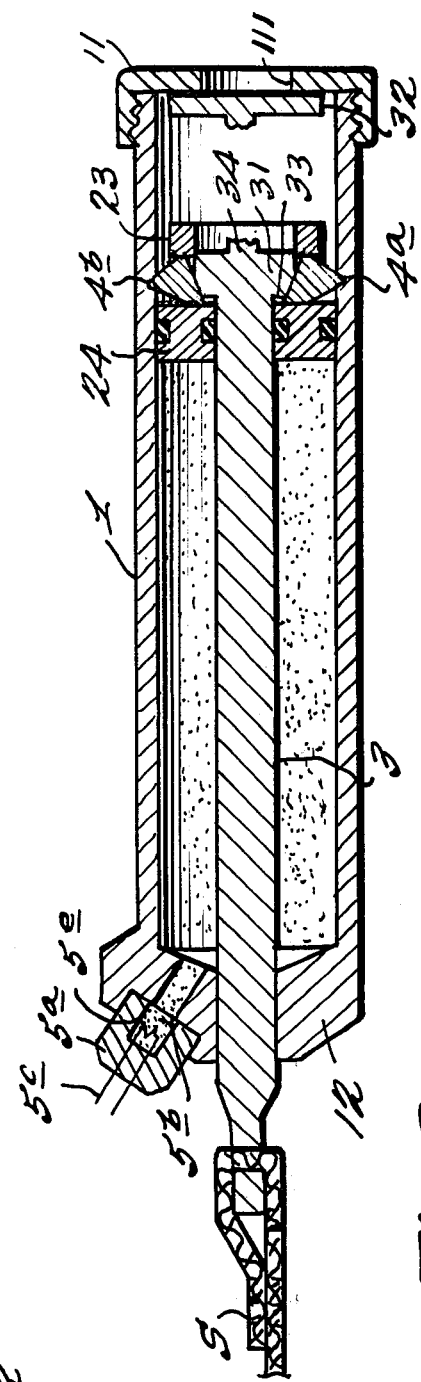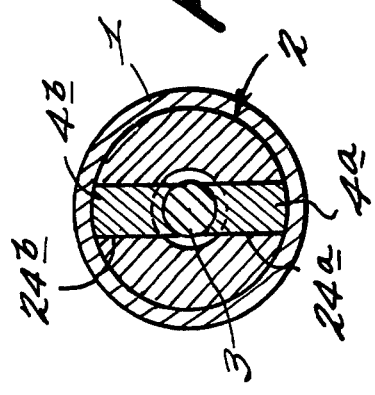

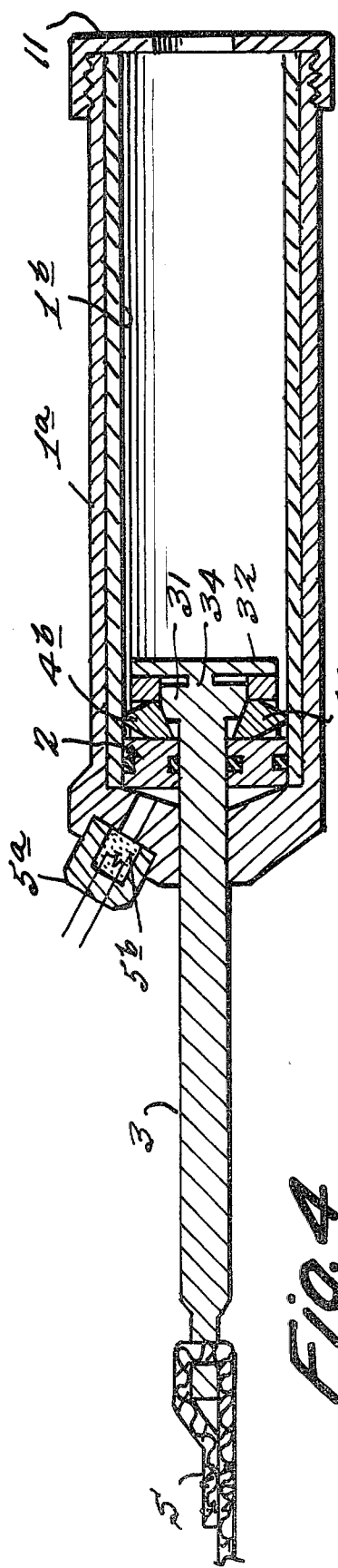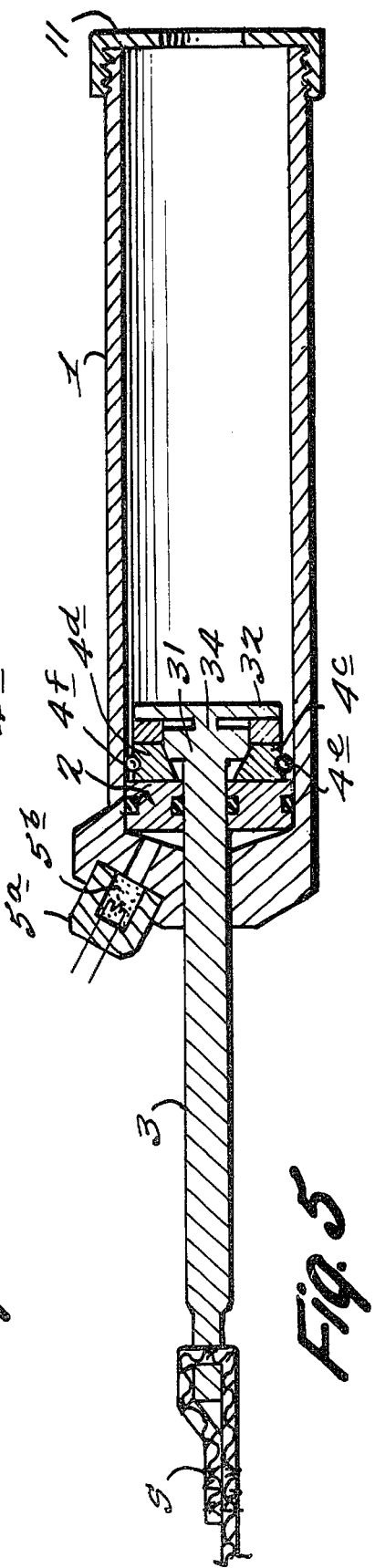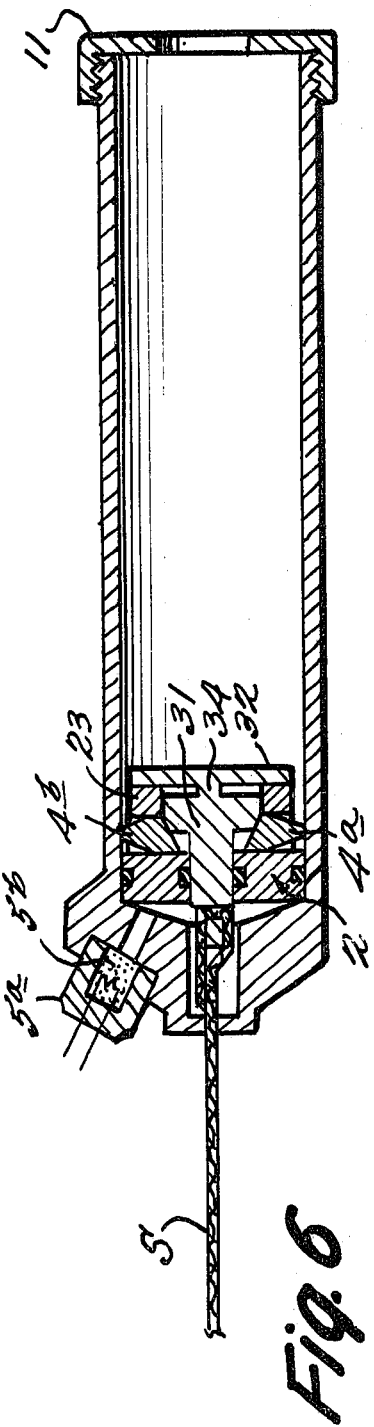

PISTON RETURN STOP DEVICE FOR TENSIONING DEVICE OF SEAT BELT

RELATED APPLICATION

Reference is made to the related copending Tsuge et al application Ser. No. 37,215, filed May 8, 1979, and our priority document referenced in the attached Declaration the contents of both of which are hereby incorporated hereinto by reference.

PREAMBLE

The present invention relates to a seat belt tensioning device having a piston return stop and generally includes a piston disposed within a cylinder and connected to the seat belt for a vehicle for restraining an occupant by the seat belt which is tensioned according to the travel of the piston within the cylinder at an urgent time such as an impact of the vehicle. By the present invention, the return of the piston can be effectively stopped after the seat belt is tensioned by a predetermined tension force due to the travel of the piston.

In one typical device of the conventional devices for stopping the return of a piston in a seat belt tensioning device of cylinder type, grooves having wedge-shaped inclined planes are formed in an outer surface of the piston which is in contact with an inner wall of the cylinder, and steel balls are accommodated within the grooves, respectively, as shown for example in the Pech U.S. Pat. No. 3,957,281 and the aforesaid copending application. In this device, when the piston, one end of which is connected to the seat belt, stops travelling within the cylinder, the steel balls travel further, due to their inertia, and belt tension forces, and cut into the inner wall of the cylinder, lifted by the wedge-shaped inclined planes. As a result, the piston is locked in the cylinder through the steel balls, tending to prevent the seat belt from extending.

However, in the above described device, when the travelling speed of the piston is low, the steel balls do not cut into the inner wall of the cylinder sufficiently, since the inertia and belt tension forces applied to the steel balls are small.

Consequently, there are some occasions when the piston is not locked in the cylinder completely. In contrast, when the travelling speed of the piston is high, the steel balls are in danger of breaking out of the cylinder wall.

There occurs a further problem that since the steel balls cut into the cylinder wall nonuniformly due to the difference between inertia force and frictional force applied to each of steel balls, the tension force of the seat belt is locally applied on the steel balls to damage the cylinder in a portion to which the load of the seat belt is centered.

Further, since the tension force of the seat belt is determined by an operating force of the piston such as a gas pressure, it is difficult to set up the tension force into a desired value precisely.

Accordingly, one object of the present invention is to provide a device which prevents the return of the piston certainly, when the tension force of the seat belt due to the travel of the piston connected to the seat belt within the cylinder reaches a predetermined value.

Another object of the present invention is to provide a safe device for stopping the return of the piston without damaging the cylinder.

Other objects and advantages of the invention will become apparent from the following description of embodiments with reference to the accompanying drawings wherein:

FIG. 1 is a longitudinal sectional view of a device according to a first embodiment;

FIG. 2 is a cross sectional view of the device of the first embodiment taken on line II—II of FIG. 1;

FIG. 3 is a longitudinal sectional view of the device of the first embodiment under operation; and FIG. 4, FIG. 5 and FIG. 6 are longitudinal sectional views of the second, third and fourth embodiments, respectively.

According to the present invention, disposed in a hole perforated through a piston is a tapered member which is connected with a seat belt so as to be moved relative to the piston, the tapered member and the piston being connected by a connecting member which is broken by a predetermined tension force. A plurality of grooves are provided in the piston in a radial direction thereof and in each is a respective stopper member. The inner surface of each of the stopper members is in contact with and supported by an inclined surface of the tapered member which rises toward its innermost end. When the piston is forced to move because of a vehicle impact and the tension force of the seat belt reaches a predetermined value, the tapered member breaks free from the piston and is pulled by that tension force within the piston in a direction reverse to the travelling direction of the piston. Then, the stopper members are pushed outwardly toward the cylinder wall by the inclined surface of the tapered member and the outer ends of the stopper members cut radially into the cylinder wall so that the return of the piston is certainly prevented.

Hereinafter, the present invention is explained in detail with reference to the drawings.

FIG. 1 to FIG. 3 show the first embodiment of the present invention.

Attached to a bottom wall portion 12 of a cylinder 1 is a powder chamber 5a which is communicated with the inside of cylinder 1. Fitted on the other end of cylinder 1 is a cap 11 in the central portion of which is a hole 111 for deflating the air out of the cylinder 1.

Slidably disposed within cylinder 1 is a piston 2. The piston 2 is composed of a main portion 23 and a flange portion 24, and is slidably in contact with the inner wall of cylinder 1. A through hole composed of a hole portion 21 and a hole portion 22 is perforated axially in piston 2. The diameter of the hole portion 21 in the main portion 23 is larger than that of the hole portion 22 in the flange portion 24. A rod 3 is inserted in the hole portions 21 and 22 of the piston 2 and a hole 121 perforating through the bottom wall portion 12 of the cylinder. One end of the rod 3 is connected with a seat belt S outside of cylinder 1. The other end of rod 3 is formed into a tapered portion 31 the diameter of which enlarges toward the end thereof within cylinder 1.

The tapered portion 31 of the rod 3 is positioned within the hole portion 21, and is integrally connected with a stopper plate 32 by a thin connecting part 34 which is breakable by a predetermined tension force. Plate 32 contacts the innermost end surface of the main piston portion 23.

In that main portion 23 of the piston 2 is a pair of guide grooves 24a and 24b which extend in the radial direction of the piston 2. The inner ends of the guide grooves 24a and 24b communicate with hole 21 of the main portion 23 and extend outward to the edge thereof.

Stopper pieces 4a and 4b are disposed in the piston guide grooves 24a and 24b so as to be slidable in the radial direction of piston 2. The inclined inner surface of each of the stopper pieces 4a and 4b is in contact with, so as to be supported by, the tapered portion 31 of the rod 3. A sharp outer end of each of the stopper pieces 4a and 4b is slidably in contact with the inner wall of cylinder 1. Stopper pieces 4a and 4b are made of a material having a high hardness and a high strength, which is obtained by heat-treating a tool steel.

O rings 26 and 27 are accommodated respectively between the flange portion 24 of the piston 2 and the inner wall of the cylinder 1, and between the flange portion 24 and rod 3 in order to maintain an air-tight condition therebetween.

An operating means for moving the piston includes a propellant 5b charged within powder chamber 5a, lead wires 5c connected to an impact sensor (not shown) and an ignition filament 5e embedded within the propellant 5b.

In the seat belt tensioning device provided with the return stop device of the piston having the above described structures, upon an impact of a vehicle signals generated in a known way in the impact sensor are passed through the lead wires 5c and the ignition filament 5c is heated to explode the propellant 5b causing plenty of gas to be produced. Due to the high pressure of the gas, piston 2 is moved to the right in FIGS. 1 and 3 together with rod 3 to tension the seat belt S and restrain the occupant on his seat.

When the tension force of the seat belt reaches a predetermined value, the thin connecting part 34 connecting the tapered portion of the rod 3 and the stopper plate 32 is broken as shown in FIG. 3. However, stopper plate 32 is moved further to the right due to the inertia thereof. The cylinder cap 11 receives the stopper plate and can conveniently prevent it from rushing out of the cylinder 1 if desired.

The tapered portion 31 of the rod 3 is then moved to the left in FIG. 3 due to the pull by the tension force of the seat belt S and is stopped by piston 2 in the stepped portion 33 of rod 3 whereby hole 22 in flange 24 prevents the tapered rod portion from moving further leftward.

The stopper pieces 4a and 4b supported by the tapered member 31 are pushed radially toward the cylinder 1 so that the sharp outer ends thereof cut into the inner wall of the cylinder 1. As a result, the piston 2 is locked in the cylinder 1 and the return of the piston is stopped with certainty.

FIG. 4 shows a second embodiment of the present invention. Disposed securely within an outer cylinder 1a made of steel is an inner cylinder 1b made of aluminum. The construction of the device of this second embodiment is otherwise similar to that of the first embodiment. Similar members to those of the first embodiment shown in FIGS. 1 to 3 are designated by the same reference characters as those of the first embodiment, and hence explanation thereof is omitted.

Since the double cylinder composed of the outer cylinder 1a and the inner cylinder 1b is used, the strength of the cylinder can be made high while the stopper pieces 4a and 4b easily cut into the inner cylinder 1b.

Stopper members which cut into the cylinder are not limited to the stopper pieces of the first and second embodiments. For example, as shown in the third embodiment illustrated in FIG. 5, supported pieces 4c and 4d which are in contact with the tapered portion 31, and steel balls 4e and 4f which are accommodated between each of the end surfaces of the supported pieces 4c and 4d and the inner wall of the cylinder, respectively, can be used as alternative stopper members.

FIG. 6 shows a fourth embodiment of the present invention. According to the fourth embodiment, the seat belt S is directly connected with tapered member 31 within the cylinder 1 in place of the rod 3 so that the weight of the device can be decreased. The device of the fourth embodiment can be effectively used when the seat belt S is made of heat-resistant and pressure-resistant material.

Instead of the cylinder having a circular cross section, a cylinder having a rectangular cross section can be used. When a cylinder having a rectangular cross section is used, the tapered member has a rectangular cross section similar to that of the cylinder, and each of the four surface portions of the tapered member, which contact and support the stopper members, is formed into an inclined plane rising toward the innermost end thereof.

As described above, according to the device for stopping the return of the piston of the seat belt tensioning device, stopper members are pushed radially to cut directly into the inner wall of the cylinder by means of the tapered member, when the tension force of the seat belt reaches a predetermined value due to the travel of the piston. Thus, the return of the piston can be stopped quickly and certainly. Since stopper members are pushed by the tapered member, they uniformly cut into the cylinder. Therefore, the tension force of the stopper members is distributed and the cylinder is not broken thereby.

Further, by varying the thickness of the thin connecting part 34 between the tapered member 31 and the stopper plate 32, the tension force of the seat belt can be accurately set to a desired value. The device of the present invention does not obstruct the travel of the piston while the seat belt is being tensioned.

Having now fully described the invention, it will be apparent to one of ordinary skill in the art that many changes and modifications can be made thereto without departing from the spirit or scope of the invention as set forth herein and defined by the following claims.

What is claimed is:

1. A seat belt tensioning device comprising:
   a cylinder,
   a piston slidably disposed within said cylinder,
   said piston having a hole along the axis thereof and a plurality of guide grooves extending in the radial direction of said piston and communicating with said hole,
   a tapered member having opposite ends and an inclined surface rising toward one end, the other end being adapted for connection to a seat belt, said tapered member being slidably disposed within said hole,
   connecting means connecting said piston and said one end and breakable by a predetermined tension force exerted on said other end of said tapered member,
   stopper members respectively disposed in said piston guide grooves so as to be slidable in the radial direction of said piston, the inner surface of said stopper members being in contact with said inclined surface of said tapered member, the outer ends of said stopper members being in slidable contact with an inner wall of said cylinder, and piston operating means for sliding said piston within said cylinder.

2. A device according to claim 1 wherein said inclined surface is of a conical shape.

3. A device according to claim 1 wherein said connecting means connecting said piston and said tapered member is made from a thin metallic member which is breakable by said predetermined tension force.

4. A device according to claim 1 wherein each said stopper member is of rod shape having a sharp outer end which is in contact with said inner wall of said cylinder, and an inclined inner surface which is in contact with said inclined surface of said tapered member.

5. A device according to claim 1 wherein each said stopper member is of rod shape having an inclined inner surface which is in contact with said inclined surface of said tapered member and said outer end is slidably contacted with said inner wall of said cylinder through a steel ball which is rotatably accommodated between said outer end of said stopper member and said inner wall of said cylinder.

6. A device according to claim 1 wherein said piston operating means comprises a powder chamber attached to an outer wall of said cylinder and communicated with an inside of said cylinder, a propellant charged within said powder chamber, an ignition filament embedded in said propellant, and lead wires for electrically connecting said ignition filament to an impact sensor.

7. A device according to claim 1 wherein said cylinder comprises an inner cylinder and an outer cylinder, said inner cylinder being made of aluminum and said outer cylinder being made of steel.

8. A device according to claim 1 wherein said tapered member is of rod shape having a conical inclined surface at said one end and being connectable with said seat belt at its other end outside said cylinder.

9. A seat belt tensioning device comprising:

cylinder means having an inner wall and at one end a fluid thrust developing means, force movable means disposed inside said cylinder and thrustable in a first direction away from said one end in response to fluid thrust upon operation of said developing means, said force movable means including a first movable member which is in fluid tight movable contact with said inner wall and a second movable member of which one end is formed into a radially reduced tapered portion with a surface which inclines outwardly toward the other end of said cylinder means, and a breakable member for connecting said first movable member and said second movable member, the other end of said second movable member of said force movable means being connectable to a seat belt, said second movable member being slidable relative to said first movable member, said breakable member being breakable by a seat belt tension force greater than said fluid thrust by a predetermined amount, and radially extending return stop means disposed within said first movable member of said force movable means so as to move therewith in said first direction and so as to be slidable in the radial direction of said first movable member when pushed by said tapered portion, said stop means having at least one sharp outer radial end in contact with said inner wall so that when seat belt tension force exceeds said fluid thrust by said predetermined amount, said breakable member of said force movable means is broken to stop said second movable member from moving in said first direction and said return stop means is pushed radially by said tapered portion being moved in the reverse direction opposite to said first direction due to said greater amount of seat belt tension force to cause said sharp end of said return stop means to cut into said inner wall and assuredly prevent movement then of said first movable member of said force movable means in said reverse direction notwithstanding said greater seat belt tension force from that reverse direction.

10. A device as in claim 9 wherein said return stop means comprises a plurality of stopper members respectively disposed in radial guide grooves in said force movable means each having an inner end in sliding contact with said tapered portion surface and a sharp outer end in contact with said inner wall.

11. A device as in claim 10 wherein said stopper members are positioned radially around said tapered portion surface at substantially equal angles.

12. A device as in claims 9, 10 or 11 wherein said first movable member is a piston which is in said fluid tight contact with said inner wall and contains said radially extending return stop means and further contains an axial hole in which said second movable member is disposed with its said tapered portion surface being in cooperation with the inner radial end of said stop means.

13. A device as in claim 9 wherein said breakable member is connected integrally with said first and second movable members and wherein said second movable member slides relative to said first movable member only when said breakable member is broken.

14. A seat belt tensioning device comprising:

cylinder means having an inner wall and at one end a fluid thrust developing means, force movable means disposed inside said cylinder and thrustable in a first direction away from said one end in response to fluid thrust upon operation of said developing means, said force movable means having opposite ends and being in fluid tight movable contact with said inner wall and having adjacent its end opposite said one end a radially reduced tapered portion with a surface which inclines outwardly toward said opposite end, the other end of said force movable means being connectable to a seat belt, and radially extending return stop means slidably disposed on said tapered portion between said cylinder means and said tapered portion for movement with said force movable means in said first direction and slidable in the radial direction of said cylinder means when pushed outwardly by said tapered portion surface, said stop means having at least one sharp outer radial end in contact with said inner wall so that when seat belt tension force is greater than said fluid thrust by a predetermined amount, at least part of said force movable means stops moving in said first direction and said return stop means is pushed outwardly by said tapered portion being moved in the reverse direction opposite to said first direction due to said greater amount of seat belt tension force to cause said sharp end of said return stop means to cut into said inner wall and assuredly prevent movement then of said force movable means in said reverse direction notwithstanding said greater seat belt tension force from that reverse direction, said return stop means comprising a plurality of stopper members respectively disposed in radial guide grooves in said force movable means each having an inner end in sliding contact with said tapered portion surface and a sharp outer end in contact with said inner wall.

15. A device as in claim 14 wherein said stopper members are positioned radially around said tapered portion surface at substantially equal angles.

16. A device as in claim 14 or 15 in which said force movable means includes at least first and second separate movable members one of which includes said tapered portion and which are slidable relative to each other in said reverse direction to cause said return stop means to move outwardly when pushed by said tapered portion surface and to cut into said inner wall as and when aforesaid.

17. A device as in claim 16 wherein said first separate member is a piston which is in said fluid tight contact with said inner wall and contains said radially extending return stop means and further contains an axial hole in which said second member is disposed with its said tapered portion surface being in cooperation with the inner radial end of said stop means.

18. A device as in claim 16 wherein said stop means is constrained by said force movable means to movement only in said radial direction.

19. A device as in claim 16 wherein said force movable means includes a third member breakably connecting said first and second movable members and breakable by said greater seat belt tension force.

20. A device as in claim 19 wherein said third member is breakably connected integrally with said first and second movable members and said second movable member slides relative to said first movable member only when said third member is broken.

* * * * *